United States Patent
Rihtar et al.

(10) Patent No.: US 11,280,305 B2
(45) Date of Patent: Mar. 22, 2022

(54) VEHICLE FUEL PUMP COVER ASSEMBLY AND METHOD

(71) Applicant: Honda Motor Co., Ltd., Tokyo (JP)

(72) Inventors: Jonathan A. Rihtar, Columbus, OH (US); Hiroshi Kitamura, Dublin, OH (US); Matthew E. Swanson, Richwood, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 416 days.

(21) Appl. No.: 16/033,934

(22) Filed: Jul. 12, 2018

(65) Prior Publication Data

US 2020/0018273 A1    Jan. 16, 2020

(51) Int. Cl.
*F02M 37/10* (2006.01)
*F02M 37/08* (2006.01)
*B60K 15/03* (2006.01)

(52) U.S. Cl.
CPC .......... *F02M 37/103* (2013.01); *B60K 15/03* (2013.01); *B60K 2015/03447* (2013.01); *B60K 2015/03453* (2013.01); *F02M 2037/082* (2013.01)

(58) Field of Classification Search
CPC .......... F02M 37/103; F02M 2037/082; B60K 15/03; B60K 2015/03447; B60K 2015/03453
USPC ....................................................... 220/241
See application file for complete search history.

(56) References Cited

U.S. PATENT DOCUMENTS

| | | | |
|---|---|---|---|
| 4,591,319 A * | 5/1986 | Takahashi | B60K 15/077 403/223 |
| 5,259,412 A | 11/1993 | Scott et al. | |
| 6,305,900 B1 | 10/2001 | Yu | |
| 6,649,828 B2 * | 11/2003 | Rockney | B60R 16/0215 174/107 |
| 7,341,047 B2 * | 3/2008 | Sone | F02M 37/103 123/495 |
| 7,642,459 B2 | 1/2010 | Motoda | |
| 8,689,827 B2 * | 4/2014 | Okazono | B01D 35/26 137/565.34 |
| 10,731,612 B2 * | 8/2020 | Aponte Hernandez | B60K 15/03 |
| 2004/0144779 A1 * | 7/2004 | Schulte | B60K 15/035 220/4.14 |
| 2005/0115054 A1 * | 6/2005 | Brandner | B29C 49/22 29/592 |
| 2007/0039963 A1 | 2/2007 | Krentz et al. | |

FOREIGN PATENT DOCUMENTS

EP        2628937        8/2013

* cited by examiner

Primary Examiner — Anthony D Stashick
Assistant Examiner — James M Van Buskirk
(74) Attorney, Agent, or Firm — Rankin, Hill & Clark LLP

(57) ABSTRACT

A fuel pump cover assembly and method for a vehicle includes a cover arranged over the vehicle fuel pump for inhibiting water access to the vehicle fuel pump and at least one clip securing the cover to a feed line for the vehicle fuel pump.

18 Claims, 6 Drawing Sheets

VEHICLE FUEL PUMP COVER ASSEMBLY AND METHOD

BACKGROUND

In a known arrangement, a fuel pump is disposed in the fuel tank of a vehicle. In particular, the fuel tank can include an upper opening through which the fuel pump is inserted and mounted. Depending on the arrangement of the vehicle frame and/or body, water potentially has access to this area in the fuel tank. Sometimes the aperture in the fuel tank through which the fuel pump is mounted is recessed relative to an upper side of the fuel tank, which can be even more problematic if water has access to the fuel pump.

BRIEF DESCRIPTION

According to one aspect, a cover assembly for a vehicle fuel pump includes a cover arranged over the vehicle fuel pump for inhibiting water access to the vehicle fuel pump and at least one clip securing the cover to a feed line for the vehicle fuel pump.

According to another aspect, a fuel pump cover assembly for a vehicle includes a cover disposed over and spaced apart from an associated fuel pump to inhibit water access to the associated fuel pump. The cover assembly further includes at least one clip affixing the cover to an associated fuel line fluidly connected to the associated fuel pump.

According to a further aspect, a cover method for covering a vehicle fuel pump includes arranging a cover over the vehicle fuel pump to inhibit water access to the vehicle fuel pump and securing the cover to a feed line for the vehicle fuel pump with at least one clip.

DETAILED DESCRIPTION

Figure 1:
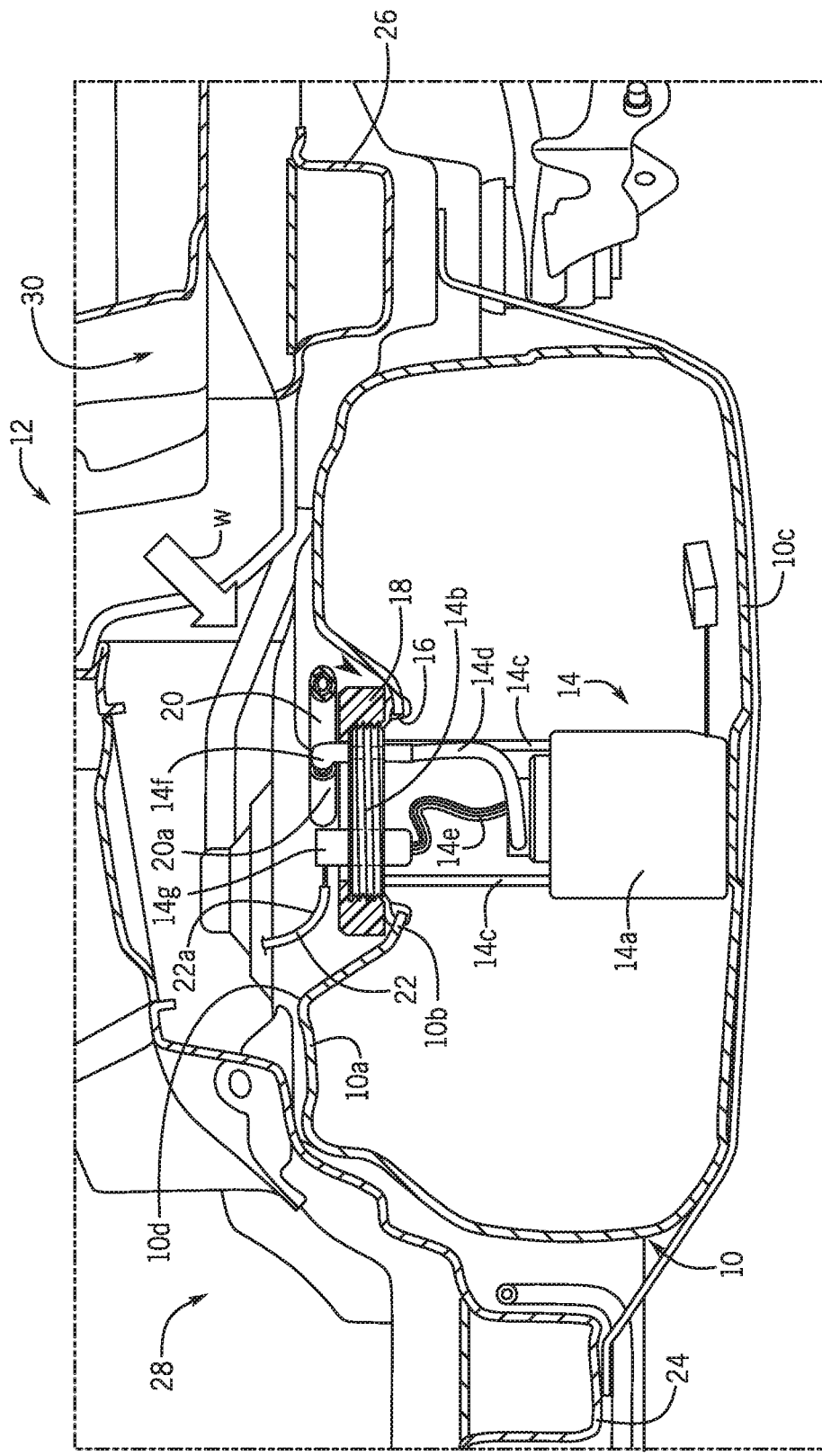
FIG. 1 schematically illustrates a cross-sectional view of a vehicle fuel pump mounted within a vehicle fuel tank.

Referring now to the drawings wherein the showings are for purposes of illustrating one or more exemplary embodiments and not for purposes of limiting the same, FIG. 1 illustrates a known arrangement wherein a fuel tank 10 is mounted within a vehicle 12. As shown, the fuel tank 10 includes a fuel pump 14 mounted through an upper opening or aperture 16 defined in the fuel tank 10. In particular, the upper opening 16 is defined in an upper side 10a of the fuel tank 10 and, more particularly, is mounted within a recessed area 10b of the upper side 10a in the illustrated embodiment, though this is not required. As shown, the fuel pump 14 includes a main body 14a arranged adjacent or resting against a bottom wall 10c of the fuel tank 10. The fuel pump 14 further includes a pump flange or pump flange member 14b spaced apart from the main body 14a and supported by posts 14c extending upward from the main body 14a. The fuel pump 14 also includes fuel feed line 14d and electrical lines 14e, both extending from the main body 14a to the pump flange member 14b.

Figure 2:
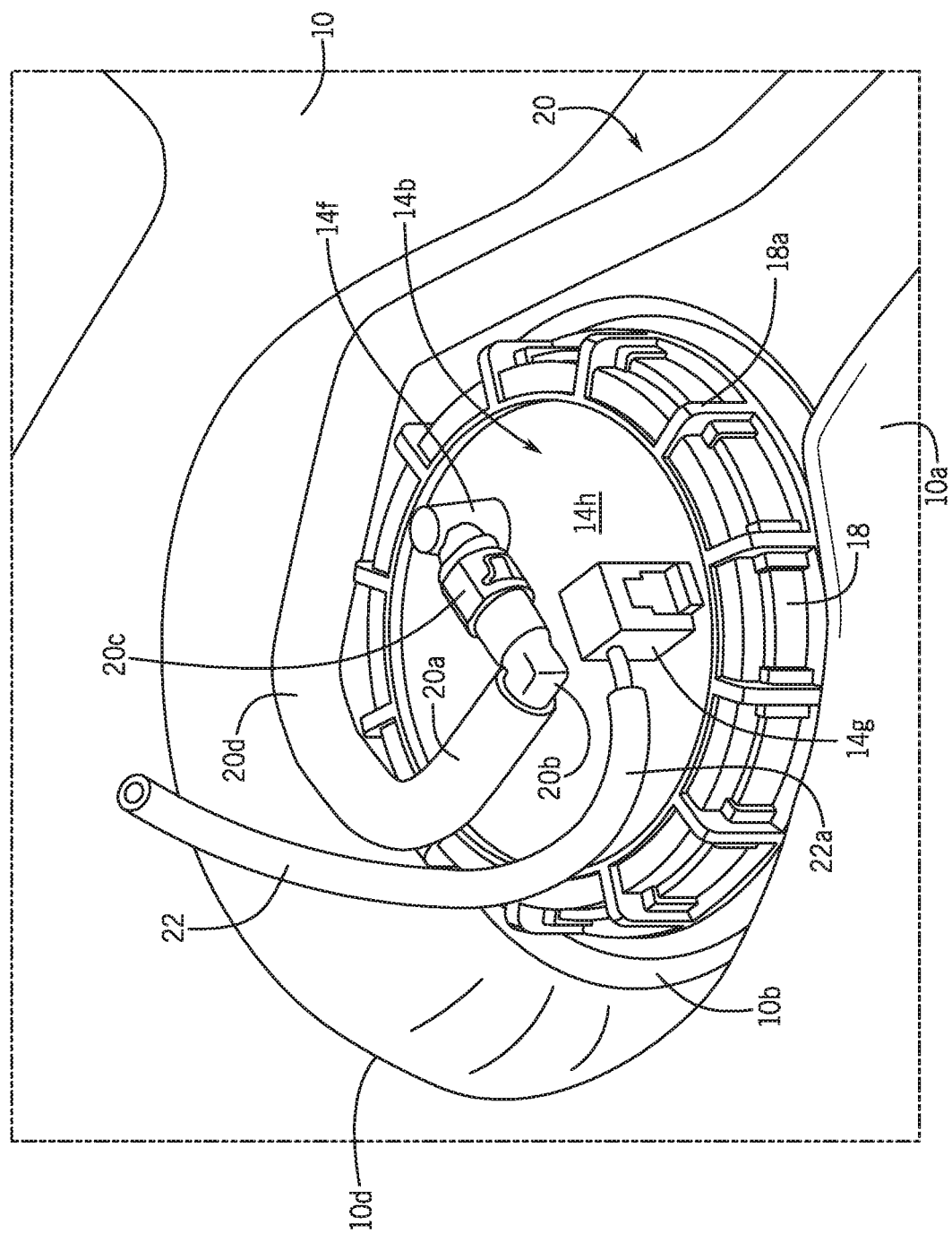
FIG. 2 is a partial perspective view of the vehicle fuel pump showing a pump flange member secured within a recessed portion of the fuel tank and having fluid and electrical connections thereon.

More specifically, and with additional reference to FIG. 2, the pump flange member 14b of the fuel pump 14 protrudes or extends through the upper opening 16 of the fuel tank 10 and thus is exposed outside the fuel tank 10. In the illustrated embodiment, the pump flange member 14b is cylindrical or puck shaped. The pump flange member 14b can be externally threaded for securing the fuel pump 14 within the fuel tank 10. An annular mounting collar 18 can be internally threaded for threaded engagement with the pump flange member 14b for securing the fuel pump 14 within the fuel tank 10. When desired, the mounting collar 18 can be unthreaded from the pump flange member 14b of the fuel pump 14, such as when desirable to replace the fuel pump 14. As shown, the mounting collar 18 can include vertically extending (i.e., axially extending) circumferentially spaced apart ribs 18a that facilitate rotation of the mounting collar 18 relative to the fuel tank 10, such as when loosening or tightening the mounting collar 18 onto the fuel tank 10.

Also, the pump flange member 14b can include an outlet port structure 14f fluidly connected to the fuel feed line 14d and an electrical adapter or connector 14g electrically connected to the electrical lines 14e. Both of the outlet port structure 14f and the connector 14g can be disposed on an exterior or exposed side 14h of the pump flange member 14b (i.e., these elements 14f, 14g are exposed and externally arranged relative to the fuel tank 10). A fuel feed line 20 has one end 20a connected to the outlet port structure 14f and an opposite end connected to an engine of the vehicle 12 (neither the opposite end, nor the engine are shown) to thereby fluidly connect the fuel pump 14 and the fuel tank 10 to the engine of the vehicle 12 and delivery fuel pumped by the fuel pump 14 from the fuel tank 10 to the engine. As shown, the fuel feed line 20 can include a feed tube 20b having an integrally formed coupling 20c provided at the end 20a for connection to the outlet port structure 14f and a foam protective layer 20d annually disposed about the feed tube 20b. A wire harness or electrical line 22 has one end 22a connected to the connector 14g for electrically connecting the fuel pump 14, such as for providing power and/or electrical communications thereto.

In the illustrated embodiment, the fuel tank 10 is disposed between lateral frame members 24, 26 of the vehicle 12. The lateral frame members 24, 26 can extend laterally across the vehicle 12 and can be secured to side frame members (not shown), such as side sill members or the like. In the illustrated embodiment, the fuel tank 10 is also arranged between a forward frame portion 28 of the vehicle 12 and a rearward frame portion 30. In one embodiment, the forward frame portion 28 is formed as part of the passenger compartment (not shown) of the vehicle 12 and the rearward frame portion 30 is formed as part of a load carrying bed portion (not shown) of the vehicle 12. Potentially, liquid or water can have access to the fuel tank 10, and particularly to the pump flange member 14b, as generally indicated by arrow W.

Figure 3:
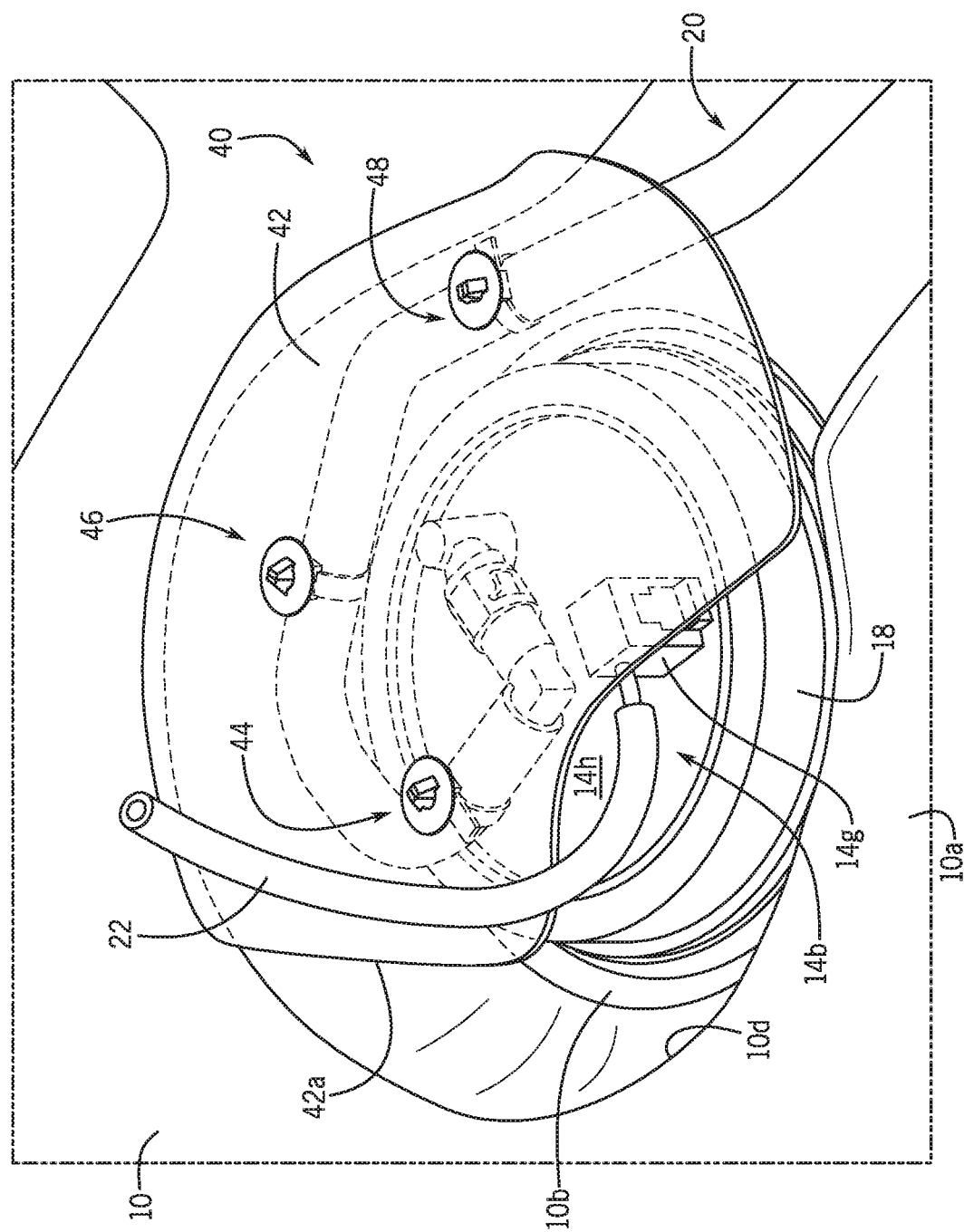
FIG. 3 is a partial perspective view similar to FIG. 2 but showing a cover assembly arranged over the vehicle fuel pump according to an exemplary embodiment.
Figure 4:
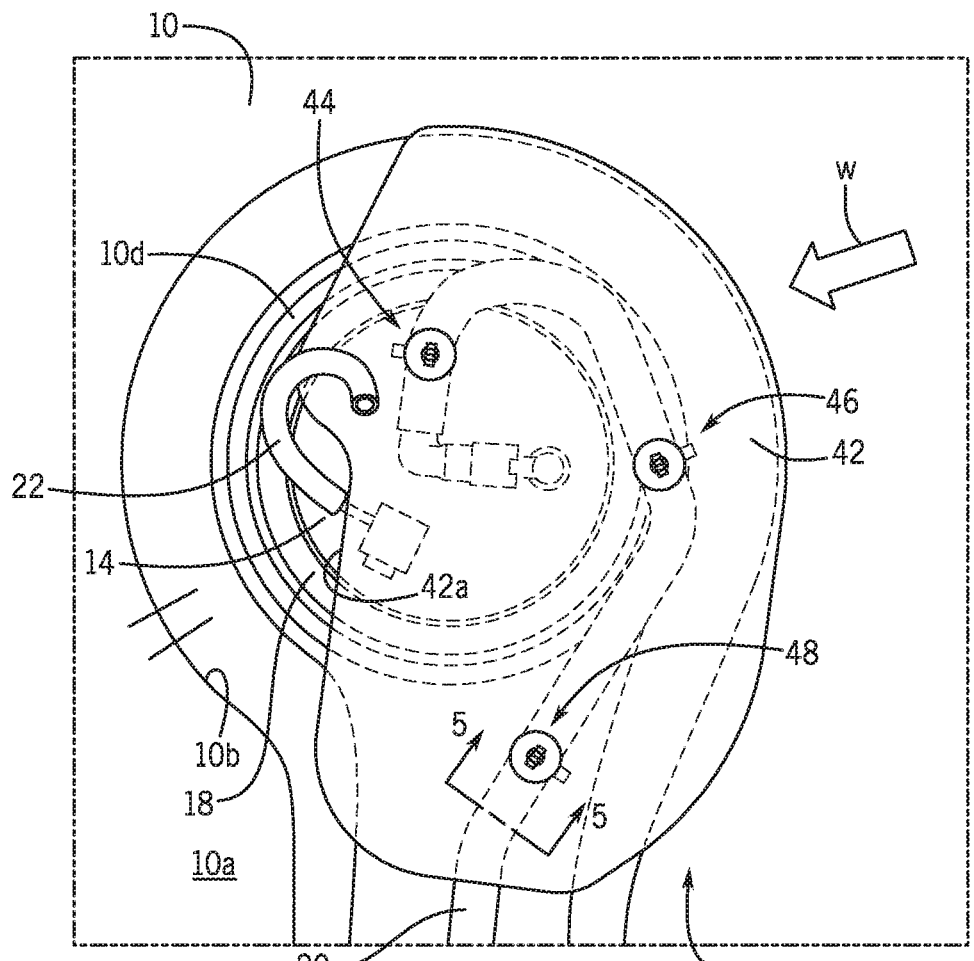
FIG. 4 is a partial top plan view of the cover assembly, fuel tank and fuel pump of FIG. 2.

To avoid such water or liquid access, with additional reference to FIGS. 3 and 4, a fuel pump cover assembly 40 for the vehicle fuel pump 14 is shown according to an exemplary embodiment. In particular, in the illustrated embodiment, the cover assembly 40 includes a cover 42 arranged over the fuel pump 14 for inhibiting water or liquid access to the fuel pump 14 and at least one clip (e.g., clips 44, 46, 48) securing the cover 42 to the fuel feed line 20. In particular, the cover 42 is disposed over and spaced apart (e.g., vertically) from the fuel pump 14 to inhibit water access to the fuel pump 14. The at least one clip (e.g., clips 44, 46, 48) affix the cover 42 to the fuel feed line 20, which is fluidly connected to the fuel pump for delivering fuel from the fuel tank 10 to the engine (not shown) of the vehicle 12 as already described herein. The fuel pump cover assembly 40 is shown covering the fuel pump 14 and the mounting collar 18, though the ribs 18a are not shown in FIGS. 3-6 for sake of simplicity but could be included as desired.

In one embodiment, the cover 42 is formed of a flexible or resilient rubber material, though the cover 42 could be formed of other materials. In a specific embodiment, the cover 42 is cut (e.g., die cut) from a sheet of flexible or resilient rubber material (e.g., a sheet of material having a thickness of 2 mm), though other manufacturing methods could be used. The cover 42 can be or include a main portion arranged to cover at least a majority portion (e.g., more than 50%) of an exposed footprint area of the fuel pump 14. In one embodiment, this exposed footprint area includes or encompasses at least the surface area defined by the exterior side 14h of the pump flange member 14b. In the same or another embodiment, this exposed footprint area includes or encompasses at least the surface area defined by the outer diameter of the mounting collar 18. In these or further embodiments, this exposed footprint area includes the recessed area 10b of the fuel tank 10. In particular, the recessed area 10b can be defined by edge 10d, which can be a rounded edge, defined into the upper side 10a of the fuel tank 10. Thus, for example, the cover 42 can bridge a distance between the vehicle fuel pump 14, and particularly the pump flange member 14b thereof, and a portion of the upper side 10a of the fuel tank 10 of the vehicle 12 that is defined around the recessed area 10b (i.e., a raised section of the fuel tank 10 relative to the recessed area 10b). In specific embodiments, including the illustrated embodiment, the cover 42 can be arranged to cover a substantial portion of the exposed footprint area. For example, the cover 42 can be arranged to cover at least 50% to 100% of the exposed footprint area. In a more specific example, the cover can be arranged to cover at least 75% of the exposed footprint area.

In these or further embodiments, the cover 42 can be arranged or positioned to cover one or both the outlet port structure 14f and/or the electrical connector 14g. When covering the outlet port structure 14f, the cover 42 can further cover an exposed portion of feed tube 20b (i.e., the portion not covered by the foam protective layer 20d) and the coupling 20c. Also, the cover 42 of the illustrated embodiment can include a side or recessed portion 42a that allows the wire harness 22 to extend vertically upward from the pump flange member 14b (i.e., the wire harness 22 does not need to be extended to wrap around the cover 42 as would be necessary if the cover 42 extended over an entirely of the surface area of the exposed side 14h and/or the surface area defined by the outer diameter of the mounting collar 18.

In the illustrated embodiment, the at least one clip includes a plurality of clips 44, 46, 48 spaced apart from one another along an axial length of the fuel feed line 20. As shown, the fuel feed line 20 can be a tube shaped feed line and the at least one clip (i.e., clips 44, 46, 48) can each be annually secured to the tube shaped fuel feed line 20, and particularly circumferentially around the foam protective layer 20d that is received around the feed tube 20b. With additional reference to FIG. 5, an enlarged view of the clip 48 is shown and will be described in further detail. It is to be appreciated that the other clips 44 and 46 can be the same as the clip 48 so all details discussed hereinbelow regarding the clip 48 can be applicable to the other clips 44, 46. Also, it is to be appreciated that, while the clips 44, 46, 48 are used in the illustrated embodiment, other types of clips or fasteners could be used to secure the cover 42.

Figure 5:
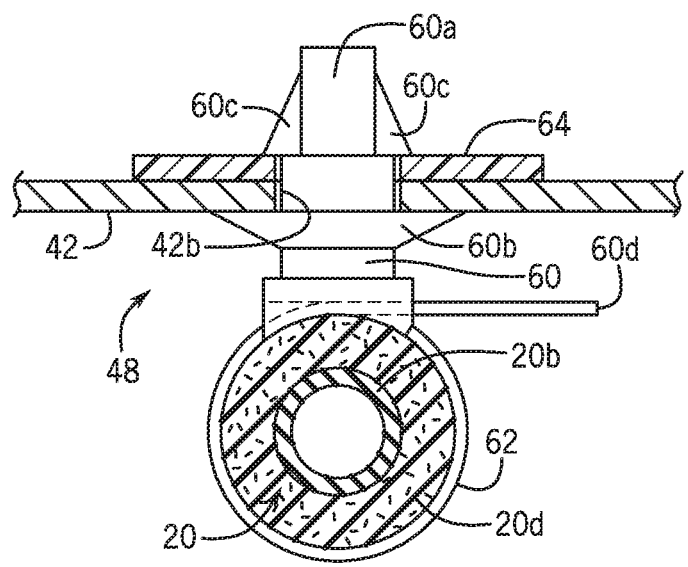
FIG. 5 is an enlarged perspective view of a clip securing the cover assembly to a feed line of the vehicle fuel pump.

As shown in FIG. 5, the clip 48 includes a clip body 60, a cable tie 62 securing the clip body 60 to the fuel feed line 20, and a securing member (e.g., a washer 64 in the illustrated embodiment) securing the cover 42 to the clip body 60. More particularly, in the illustrated embodiment, the clip body 60 can include an upward protruding locking structure 60a that is received through a corresponding clip aperture 42b defined in the cover 42 and through the washer 64 with resilient wings 60c of the clip body biased outwardly to lock the washer 64 and thereby the cover 42 to the clip body 60. The clip body 60 can also include an underside washer structure 60b for supporting an underside of the cover 42. As shown, the washer 64 can be received on the upward protruding locking structure 60a of the clip body 60 with the cover 42 interposed between the clip body 60, and specifically the underside washer structure 60b, and the washer 64 to secure the cover 42 to the clip body 60. The cable tie 62 can cooperatively lock the clip body 60 to the fuel feed line 20, such as by having a flexible tape section with teeth (not shown) provided on the cable tie 62 that engage with a pawl (not shown) provided within the clip body 60 to form a ratchet so that the free or distal end 60d of the cable tie 62 is pulled to tighten the cable tie 62 and does not come undone as is known and understood by those skilled in the art.

Figure 6:
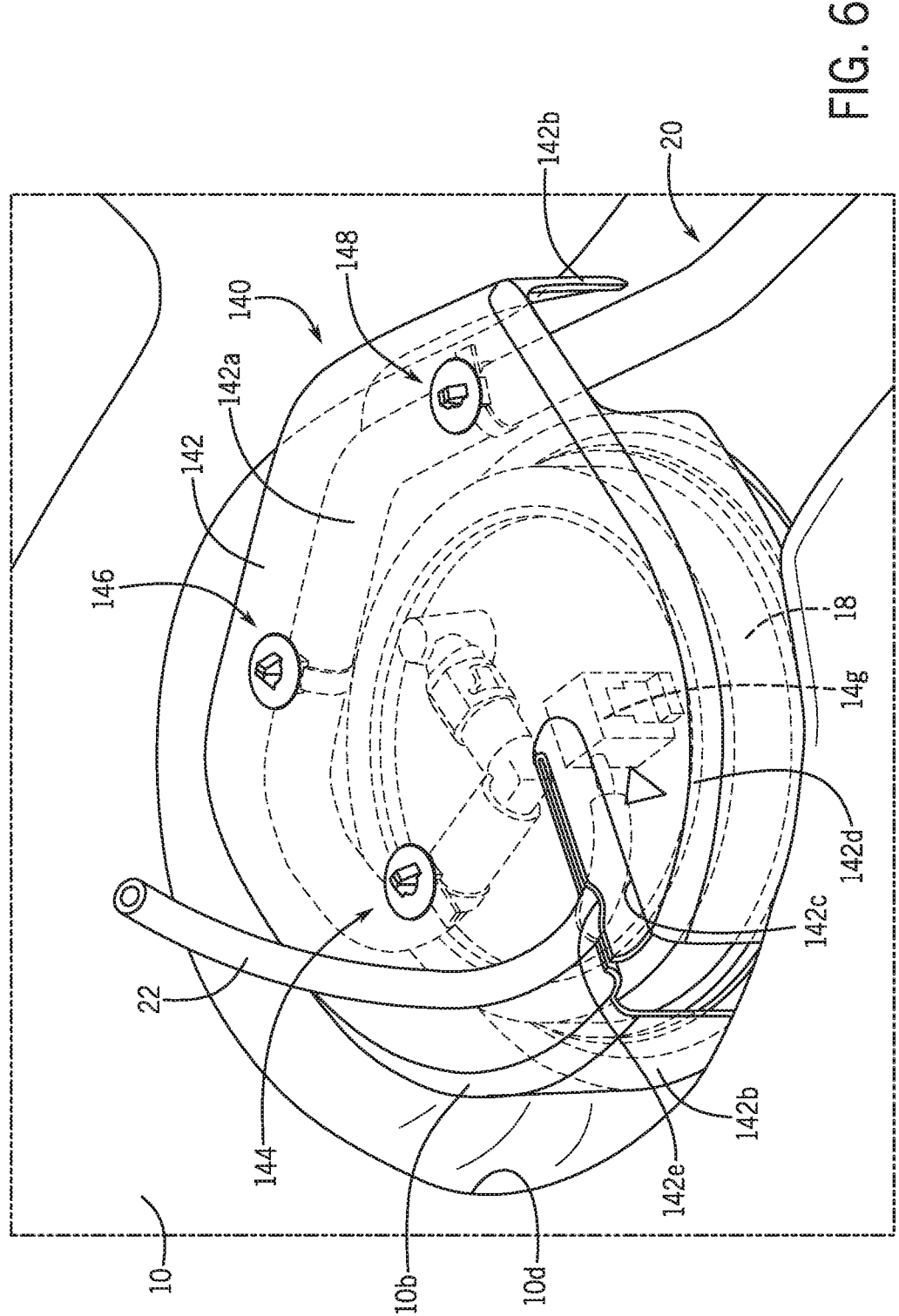
FIG. 6 is a partial perspective view similar to FIGS. 2 and 3 but showing a cover assembly arranged over the vehicle fuel pump according to another exemplary embodiment.
Figure 7:
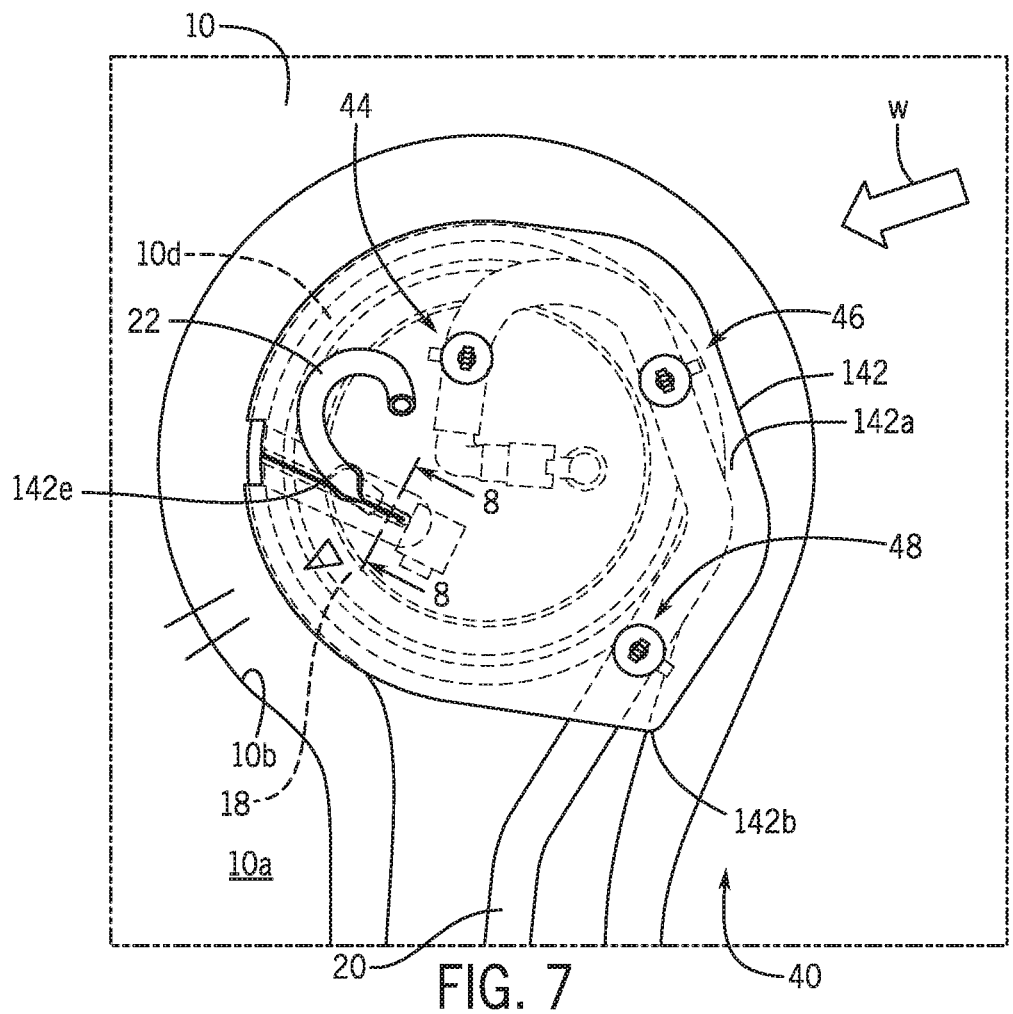
FIG. 7 is a partial top plan view of the cover assembly, fuel tank and fuel pump of FIG. 6.
Figure 8:
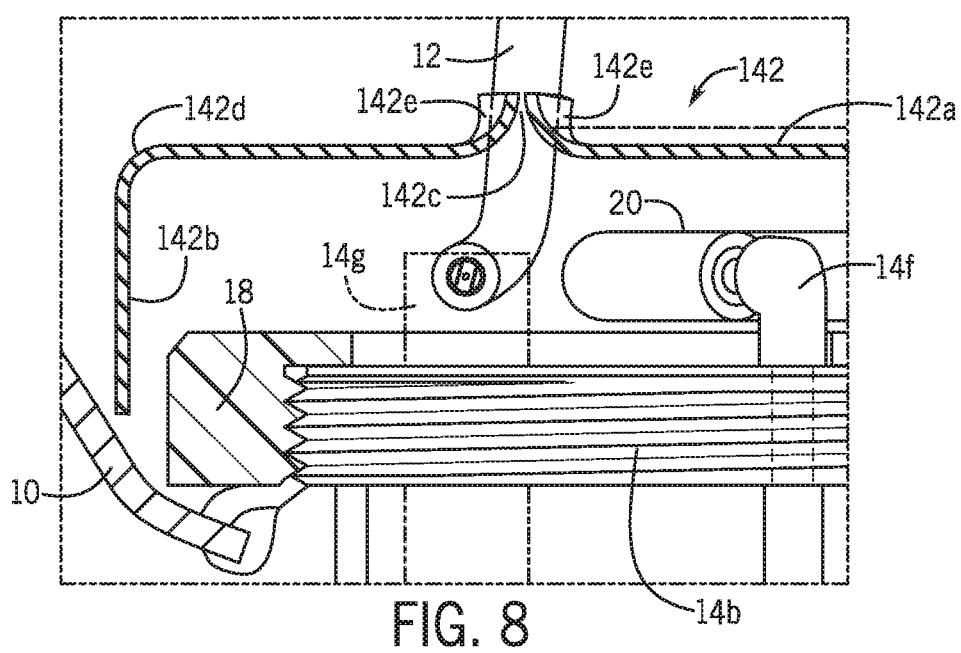
FIG. 8 is a partial schematic cross-sectional view showing a sealing feature of the cover assembly of FIGS. 6 and 7.

With reference to FIGS. 6-8, a fuel pump cover assembly 140 for the vehicle fuel pump 14 is shown according to an alternate exemplary embodiment. Except as indicated below, the cover assembly 140 can be the same or similar to the cover assembly 40 described hereinabove. In particular, in the embodiment illustrated in FIGS. 6-8, the cover assembly 140 includes a cover 142 arranged over the fuel pump 14 for inhibiting water or liquid access to the fuel pump 14 and at least one clip (e.g., clips 144, 146, 148) securing the cover 142 to the fuel feed line 20. In particular, like the cover 42, the cover 142 is disposed over and spaced apart (e.g., vertically) from the fuel pump 14 to inhibit water access to the fuel pump 14. The at least one clip (e.g., clips 144, 146, 148) affixes the cover 142 to the fuel feed line 20.

In one embodiment, the cover 142 is formed of a rubber material, though the cover 142 could be formed of other materials. In particular, in one specific embodiment, the rubber material of the cover 142 can optionally be more rigid than the flexible rubber material used for the cover 42 so that the cover 142 can be formed into, and maintained in, a desired shape. As shown, the cover 142 can include a main portion or main body 142a arranged to cover at least a majority portion (e.g., more than 50%) of an exposed footprint are of the fuel pump 14. In one embodiment, this exposed footprint includes or encompasses at least the surface area defined by the exterior side 14h of the pump flange member 14b. In the same or another embodiment, this exposed footprint area includes or encompasses at least the surface area defined by the outer diameter of the mounting collar 18. In the illustrated embodiment, the cover 142 covers or extends over an entirety of the surface area of the pump flange member 14*b* and an entirety of the surface area defined by an outside diameter of the mounting collar 18.

Unlike the cover 42, the cover 142 can further include a flange portion or portions 142*b* downwardly depending from the main portion 142*a* and arranged approximately orthogonally relative to the main portion 142*a* (i.e., oriented orthogonally relative to a plane in which the main body or portion 142*a* is disposed). As best shown in FIG. 8, the flange or flange portions 142*b* can extend downwardly from the main portion 142*a* a distance sufficient to bridge a vertical gap between the main portion 142*a* and the exposed side 14*h* of the pump flange member 14*b* and/or an upper extent of the mounting collar 18. Further, the flange portion or portions 142*b* can extend downward into the recessed area 10*b* of the fuel tank 10.

Like the cover 42, the cover 142 can be arranged or positioned to cover one or both of the outlet port structure 14*f* and/or the electrical connector 14*g*. When covering the outlet port structure 14*f*, the cover 142 can also further cover an exposed portion of the feed tube 20*b* and the coupling 20*c*. The clips 144, 146, 148 can be identical or similar to the clips 44, 46, 48 so no further explanation is provided herein regarding the clips 144, 146, 148, though like the clips 44, 46, 48, it is to be appreciate that other clips or fasteners could be used in place of the clips 144, 146, 148.

As shown, in the illustrated embodiment, the cover 142 can include an aperture 142*c* through which the wire harness 22 passes. In particular, the aperture 142*c* can be a slot extending from a peripheral edge 142*d* of the main portion 142*a* and extend through the flange or flange portion 142*b*. The aperture 142*c* can extend inwardly into the main portion 142*a* from the peripheral edge 142*d* a distance sufficient to clear or extend past the location at which the wire harness 22 extends upward from the fuel pump 14. As shown, the cover 142, and particularly the main portion 142*a* thereof, can include upturned lip portions 142*e* defining the aperture 142*c* for urging water away from the aperture 142*c*.

In particular, with the cover 142 formed of a flexible material, the width of the aperture 142*c* in the slot configuration as shown can be smaller than an external diameter of the wire harness 22 such that passing of the wire harness 22 through the aperture 142*c* results in the upturned lip portions 142*e* curving upward as best shown in FIG. 8 so that any water or the like received on the main portion 142*a* will be urged away from the aperture 142*c* via the upturned lip portions 142*e*. The upturned lip portions 142*e* can be referred to as a self-sealing portion or feature that closes about the wire harness 22. That is, as already described, passing of the wire harness 22 through the aperture 142*c* forces the upturned lip portions 142*e* upward; however, due to the resiliency of the material selected for the cover 142, the upturned lip portions 142*e* are urged toward one another thereby self-sealing about the wire harness 22.

A cover method for covering a vehicle fuel pump will now be described. In particular, the cover method will be described in association with the fuel pump cover assemblies, 40, 140 described hereinabove, though it is to be appreciated and understood that the method could be used with other fuel pump cover assemblies. In the method, cover 42 or 142 is arranged over the vehicle fuel pump 14 to inhibit water access to the vehicle fuel pump 14. The cover 42 or 142 is secured to the fuel feed line 20 for the vehicle fuel pump 14 with at least one clip, such as clips 44, 46, 48 or 144, 146, 148. In the method, arranging of the cover over the vehicle fuel pump 14 and securing the cover 42 or 142 to the fuel feed line 20 can include vertically spacing the cover 42 or 142 above the vehicle fuel pump 14.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A cover assembly for a vehicle fuel pump, comprising:
a cover arranged over the vehicle fuel pump for inhibiting water access to the vehicle fuel pump; and
at least one clip attached to the cover, the at least one clip directly securing the cover to a feed line for the vehicle fuel pump, wherein the feed line is a tube shaped feed line and the at least one clip is annularly secured to an outer surface of the tube shaped feed line, wherein the at least one clip includes a clip body having a locking structure that is received through a clip aperture defined in the cover.

2. The cover assembly of claim 1 wherein the at least one clip includes a plurality of clips spaced apart from one another along a axial length of the tube shaped feed line.

3. The cover assembly of claim 1 wherein the at least one clip includes:
a cable tie securing the clip body to the feed line; and
a washer securing the cover to the clip body.

4. The cover assembly of claim 3 wherein the locking structure protrudes upwardly from the clip body, the washer received on the upward protruding locking structure with the cover interposed between the clip body and the washer to secure the cover to the clip body.

5. The cover assembly of claim 1 wherein the cover bridges a distance between the vehicle fuel pump and a raised section on a fuel tank of the vehicle.

6. The cover assembly of claim 1 wherein the cover includes an aperture through which a wire harness passes, the wire harness electrically connected to the vehicle fuel pump.

7. The cover assembly of claim 6 wherein the aperture is a slot extending into the cover from a peripheral edge of the cover.

8. The cover assembly of claim 7 wherein the cover includes upturned lip portions defining the slot for urging water away from the slot.

9. The cover assembly of claim 1 wherein the cover includes a main portion arranged to cover a substantial portion of an exposed footprint area of a pump flange member of the vehicle fuel pump.

10. The cover assembly of claim 9 wherein the main portion of the cover is arranged and sized to cover an entirety of the footprint area of the pump flange member of the vehicle fuel pump.

11. The cover assembly of claim 1 wherein the cover is formed of a flexible or resilient rubber material.

12. A fuel pump cover assembly for a vehicle, comprising:
a cover disposed over and spaced apart from an associated fuel pump to inhibit water access to the associated fuel pump; and
at least one clip affixing the cover to an associated fuel line fluidly connected to the associated fuel pump, wherein the at least one clip includes:
a clip body;
a cable tie annularly securing the clip body to an outer surface of the associated fuel line; and a securing member affixed to the clip body for securing the cover to the clip body.

13. The fuel pump cover assembly of claim 12 further including a self-sealing portion that closes about an associated wire harness electrically connected to the associated fuel pump and passing through an aperture defined in the cover.

14. The fuel pump cover assembly of claim 12 wherein the cover is formed of a resilient flexible material, the cover sized and arranged to substantially cover a footprint area of the associated fuel pump.

15. The fuel pump cover assembly of claim 12 wherein the cover includes a main body having a surface area larger than a footprint of the associated fuel pump.

16. The fuel pump cover assembly of claim 15 wherein the cover includes flange portions downwardly depending from the main body and arranged approximately orthogonally relative to the main body.

17. A cover method for covering a vehicle fuel pump, comprising:
    arranging a cover over the vehicle fuel pump to inhibit water access to the vehicle fuel pump;
    providing at least one clip with a clip body, a cable tie, and a securing member affixed to the clip body;
    inserting the clip body through a clip aperture provided on the cover with the cover interposed between the clip body and the securing member; and
    securing the cover directly to a fuel feed line for the vehicle fuel pump with the at least one clip by annularly securing the clip body to an outer surface of the fuel feed line via the cable tie.

18. The cover method of claim 17 wherein arranging the cover over the vehicle fuel pump and securing the cover to the fuel feed line includes vertically spacing the cover above the vehicle fuel pump.

* * * * *